United States Patent [19]

Cheng et al.

[11] 4,193,769

[45] Mar. 18, 1980

[54] ZNO DISPERSIONS BY DECOMPOSITION OF ZNCO$_3$

[75] Inventors: William J. Cheng; David B. Guthrie, both of St. Louis, Mo.

[73] Assignee: Petrolite Corporation, St. Louis, Mo.

[21] Appl. No.: 953,983

[22] Filed: Oct. 23, 1978

[51] Int. Cl.$^2$ .............................................. C01G 9/02
[52] U.S. Cl. ........................................... 44/51; 44/67; 252/18; 252/25; 252/308; 423/101; 423/104; 423/622
[58] Field of Search ................. 44/51, 67; 252/18, 25, 252/308; 423/101, 104, 622

[56] References Cited

U.S. PATENT DOCUMENTS 3,409,560  11/1968  Faust et al. ................................ 44/51
3,674,476  7/1972  Tamai et al. ........................... 423/622

Primary Examiner—Delbert E. Gantz
Assistant Examiner—Jacqueline Howard
Attorney, Agent, or Firm—Sidney B. Ring; Hyman F. Glass

[57] ABSTRACT

This invention relates to stable, fluid zinc-containing dispersions and the preparations thereof by the high temperature decomposition of ZnCO$_3$ to ZnO in a dispersant-containing fluid.

6 Claims, No Drawings

ZNO DISPERSIONS BY DECOMPOSITION OF ZNCO₃

Dispersions of magnesium-containing compounds have been heretofore prepared by various methods. One such method, which involves the reaction of Mg metal with an alcohol to form an intermediate magnesium alkoxide, is a complicated multi-stepped process. The following are illustrative:

| U.S. Pat. Nos. | 2,570,058 | 2,834,662 |
|---|---|---|
| | 2,582,254 | 2,895,913 |
| | 2,593,314 | 2,939,808 |
| | 2,692,239 | 3,018,172 |
| | 2,788,325 | 3,150,089 |
| Belgian Patents | 842,131 | |
| | 818,960 | |

Ulric B. Bray, Charles R. Dicket and Vanderveer Voorhees Ind. Eng. Chem., Prod. Res. Dev., 14, 295-8 (1975).

Other processes employing already formed MgO, although not considered suitable by Bray, Dickey and Voorhees (loc. cit.), are illustrated by the following:

| U.S. Pat. Nos. | 3,018,172 | 3,865,737 |
|---|---|---|
| | 3,524,814 | 3,928,216 |
| | 3,629,109 | |
| Belgian Patent | 817,035 | |
| Netherlands Application | 6,410,242 | |

Ser. No. 816,626 filed July 18, 1977 relates to stable, fluid magnesium-containing dispersions, and the preparation thereof, by the high temperature dehydration of $Mg(OH)_2$ to MgO in a dispersant-containing fluid.

Ser. No. 840,192 filed Oct. 17, 1977 and Ser. No. 853,600 filed Nov. 21, 1977 relate to stable, fluid magnesium-containing dispersions, and the preparation thereof, by the high temperature decomposition of magnesium carboxylates such as magnesium acetate to MgO in a dispersant-containing fluid.

Ser. No. 885,150 filed Mar. 10, 1978 relates to stable, fluid magnesium-containing dispersions and the preparation thereof by the high temperature decomposition of $MgCO_3$ to MgO in a dispersant-containing fluid.

Not all metal compounds behave similarly. For example, in Ser No. 894,979 filed Apr. 10, 1978 there is described and claimed a process where calcium acetate is decomposed in a dispersant-containing fluid to yield calcium carbonate instead of calcium oxide. This is in contrast to an analogous process employing magnesium acetate where MgO is obtained under similar conditions.

We have now discovered a facile method of preparing stable, fluid zinc-containing dispersions which comprises heating $ZnCO_3$ in the presence of a fluid of low volatility containing a dispersing agent soluble in said fluid to effect its decomposition into ZnO and $CO_2$ at temperatures substantially lower than required when $ZnCO_3$ in the dry state is decomposed into the aforesaid products.

The process, in essence, comprises an almost "explosive" decomposition of zinc carbonate to zinc oxide according to the equation

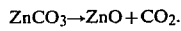

During this decomposition, $ZnCO_3$ is disintegrated into minute particles of ZnO which are immediately suspended and become stabilized in the fluid by the presence of a dispersing agent.

Any suitable zinc carbonate capable of being subdivided upon decomposition into submicron particles of zince oxide can be employed.

Any suitable non-volatile process fluid capable of being heated to the decomposition temperature of $ZnCO_3$ can be employed. The process fluid should be relatively stable and relatively non-volatile at the decomposition temperature. However, any volatility encountered is readily controlled by refluxing and condensing apparatus.

Examples of such non-volatile process fluids are as follows: hydrocarbons (such as mineral oil, paraffin oil, or aromatic oil), diphenyl oxide fluids, silicone oils, polyglycol ethers or vegetables oils, etc., solely the dispersant, or any combinations thereof.

The non-volatile process fluid should contain a dispersant(s) capable of retaining the zinc compound formed by decomposition in stable suspension. Any suitable dispersant which is relatively stable under the high temperature conditions of this invention can be employed.

These are illustrated by the following: saturated and unsaturated fatty acids (such as stearic acid and oleic acid) and derivatives thereof (such as sorbitan monooleate), sulfonic acids (such as mahogany or petroleum derived sulfonic acids and synthetic sulfonic acids), naphthenic acids, oxyalkylated fatty amines, alkylphenols, sulfurized alkylphenols, oxyalkylated alkylphenols, etc.

In the event that an above-mentioned organic carboxylic acid of sulfonic acid or any combination thereof is to be used as the dispersant, it is obvious that it is to react with a basic zinc compound to form a salt or other complex. The zinc salt or complex of such acid moiety is formed by the reaction of an equivalent of basic zinc moiety (such as, for example, zinc oxide, zinc hydroxide, zinc carbonate, or any mixtures thereof) with a corresponding equivalent of acid moiety.

Whereas the temperature for the decomposition of dry $ZnCO_3$, which is not wet with any very high boiling fluid, evolves $CO_2$ primarily at about 300° C., the liberation of $CO_2$ by its volatility by this invention starts at substantially lower temperatures.

In the practice of this invention, temperatures of about 175° to 450° C. are employed, such as from about 200° C. to 400° C., but preferably from about 225° C. to 350° C.

The particle size of the resulting ZnO so formed in general should be of a size which is stable and fluid. In practice, the particle size is no greater than about 5 microns, such as no greater than about 2 microns, but preferably no greater than about one micron.

The concentration of the zinc compound so formed in the non-volatile process fluid should be no greater than that concentration which maintains suitable fluidity. In general, the final concentration based on non-volatile fluid and other materials is from about 1% to 34% when calculated as percent zinc, such as from about 2% to 32%, for example, from about 3% to 30% but preferably from about 4% to 28%.

The concentration of the dispersant in the non-volatile process fluid should be sufficient to maintain a fluid, stable dispersion of zinc oxide in the fluid. In general the weight concentrations of dispersant and non-volatile fluid may range from 100% dispersant and 0% non-volatile fluid to as little as 0.01% dispersant and 99.99% fluid, such as from about 95% and 5%, for example from about 90% to 10%, but preferably from about 85% to 15%.

Although we do not wish to be bound by actual theory, we believe that the formation of dispersible zinc oxide results from the in situ formation of highly porous and sub-micron sized ZnO at the instant $CO_2$ is liberated from $ZnCO_3$ at its decomposition temperature. In such a form the resulting ZnO is immediately dispersed and stabilized by the action of the dispersing agent. Prior art procedures do not prepare ZnO dispersions by employing the high temperature decomposition of $ZnCO_3$ directly in the dispersing fluid which is necessary for the product and process of this invention, and therefore, do not achieve a stable dispersible zinc oxide but instead attempt to achieve zinc dispersibility through suspensions of solid zinc compounds, such as zinc oxide which suspensions are white and eventually settle out rather than the stable dark clear dispersions of this invention.

The following examples are presented for purposes of illustration and not of limitation.

EXAMPLE 1

To a 1-liter glass reaction flask with agitator are charged 500 g. hydrocarbon oil and 128 g. (about 0.4 equiv.) naphthenic acids. The contents are heated to 200° C. and 23.3 g. (about 0.4 equiv.) basic zinc carbonate (at 70.0% ZnO content) is added. The contents are stirred at 190°–200° C. for 1½ hours. The mass is then heated to 260°–310° C. and placed under slightly reduced pressure to facilitate the removal of by-product $H_2O$. Upon cooling and centrifugation, there is only a trace of white solids at the bottom of the centrifuge tube.

EXAMPLE 2

To a 500 ml. glass reaction flask with agitator are charged 162.8 g. of zinc naphthenate solution from example 1 and 30.0 g. basic zinc carbonate (at 70.0% ZnO) content. The contents are heated to 260° C. There is elimination of some vapors including hydrocarbon oil. Heating is continued to 330° C. at which temperature there is no further decomposition taking place. Upon cooling, the weight of the mass is 162.5 g.; a centrifugation test indicates only 0.075 % insolubles. A portion of the clear, bright supernatant layer upon ashing gives 15.8 % as ZnO or 12.74% when calculated as Zn.

EXAMPLE 3

To the reactor of Example 2 are charged 162.8 g. zinc naphthenate solution of example 1 and 60.0 g. basic zinc carbonate and the contents are heated as in Example 2. Upon cooling the weight of the contents is 182.2 g.; upon centrifugation, the amount of insolubles measures only 0.075%. A portion of the clear, bright supernatant layer upon ashing gives 26.5% as ZnO or 21.3% when calculated as Zn.

EXAMPLE 4

To the glass reactor of Example 2 are charged 125.0 g. hydrocarbon oil, 32.0 g. naphthenic acid and 4.0 g. ZnO. A solution of zinc naphthenate is made similar to that of Example 1. To the solution of zinc naphthenate is added 90.0 g. basic zinc carbonate and the contents heated as in Example 2. Upon cooling, the weight of the reactor contents is 207.2 g. Upon centrifugation, the insoluble layer measures 1.5%. The clear, bright supernatant layer upon ashing gives 32.5% as ZnO or 26.1% when calculated as Zn.

The compositions of this invention have a wide variety of uses. They are useful in rubber compounds, paints, corrosion inhibitors, pharmaceutical and cosmetic formulations such as ointments, etc.

We claim:

1. A process of preparing a stable, bright, clear, fluid zinc-containing dispersion which comprises decomposing $ZnCO_3$ to ZnO at a temperature between about 175° C. to about 450° C. in a dispersant-containing fluid, said fluid being a non-volatile process fluid capable of being heated to the decomposition temperature of $ZnCO_3$, said dispersant being relatively stable under the high temperature conditions of this process and being capable of retaining the zinc compound formed by decomposition in stable suspension.

2. The process of claim 1 where the decomposition temperature is between about 225°0 C. and 350° C.

3. The product of claim 1 wherein the particle size of the ZnO formed in the dispersion is no greater than about 5 microns.

4. The product of claim 1 wherein the particle size of the ZnO formed in the dispersion is no greater than about 1 micron.

5. The process of claim 1 where the non-volatile process fluid is mineral oil, paraffin oil, aromatic oil, diphenyl oxide fluids, silicone oils, polyglycol ethers or vegetable oils.

6. The process of claim 1 where the dispersants are saturated and unsaturated fatty acids and derivatives thereof, mahogany or petroleum derived sulfonic acids, synthetic sulfonic acids, naphthenic acids, oxyalkylated fatty amines, alkylphenols, sulfurized alkylphenols or oxyalkylated alkylphenols.

* * * * *